United States Patent
Dixon et al.

[15] 3,656,909
[45] Apr. 18, 1972

[54] CHOLESTERIC LIQUID CRYSTAL STABILIZERS FOR DETECTOR ELEMENTS

[72] Inventors: George D. Dixon, Monroeville; Luciano C. Scala, Murrysville, both of Pa.

[73] Assignee: Westinghouse Electric Corporation, Pittsburgh, Pa.

[22] Filed: Feb. 16, 1970

[21] Appl. No.: 11,449

[52] U.S. Cl. ................23/253 TP, 23/230 LC, 252/408, 350/160
[51] Int. Cl. ..................C09k 1/00, G01n 31/22, G02f 1/00
[58] Field of Search.................23/253 TP, 230 LC; 252/408

[56] References Cited

FOREIGN PATENTS OR APPLICATIONS 1,161,039  8/1969  Great Britain.....................23/230 LC Primary Examiner—Morris O. Wolk
Assistant Examiner—R. M. Reese
Attorney—A. T. Stratton and Alex Mich, Jr.

[57] ABSTRACT

A sensing device is made by protectively packaging a cholesteric liquid crystalline material containing from about 0.3 to 7 weight percent of an ultraviolet radiation stabilizer consisting of either aromatic azo or aromatic azoxy compounds, in a clear compatible protective polymeric material.

12 Claims, 6 Drawing Figures

AL - ALUMINUM BLOCK
CU - COPPER BLOCK
B - WORKING BATTERY
TC - THERMOCOUPLE
TE - THERMOELECTRIC ELEMENT
TH1, TH2 - THERMISTORS

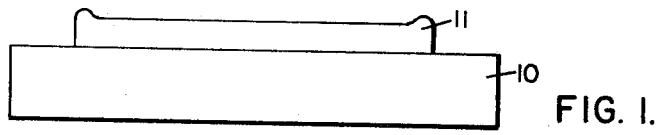
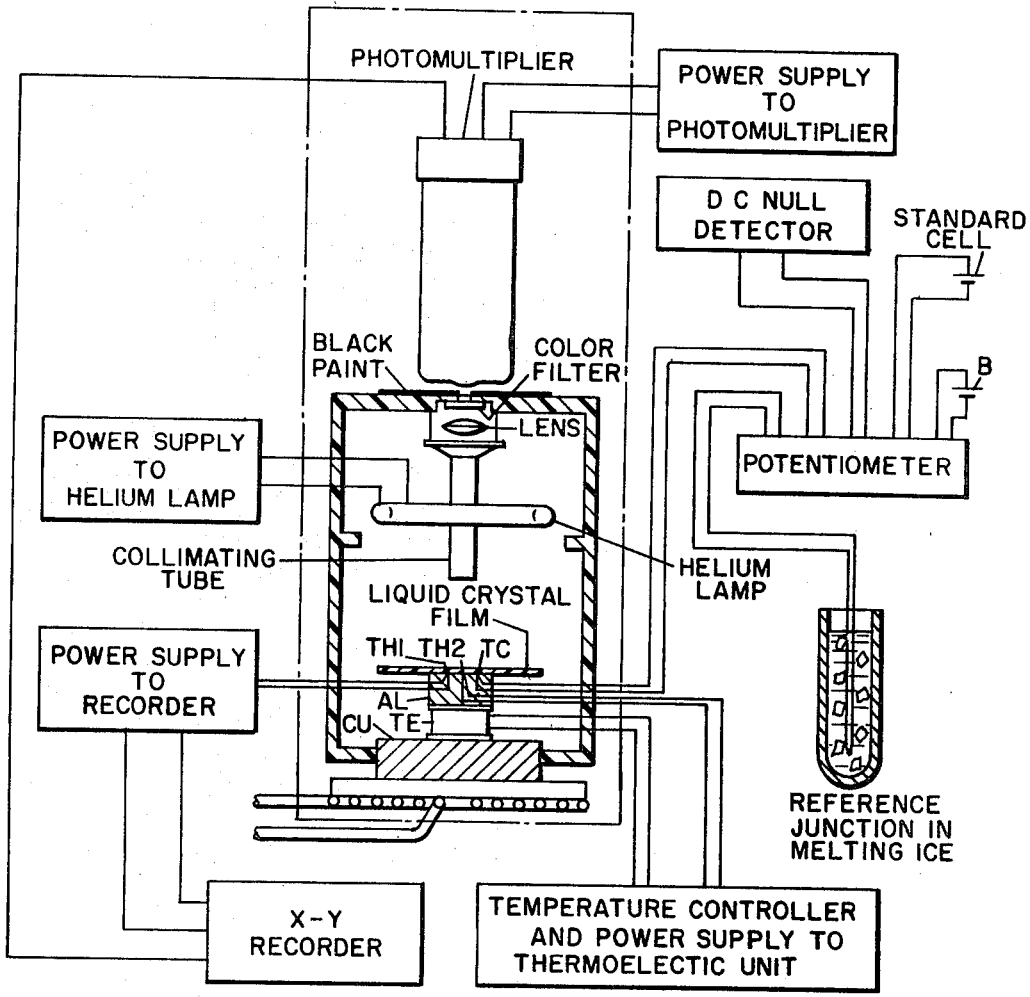

CHOLESTERIC LIQUID CRYSTAL STABILIZERS FOR DETECTOR ELEMENTS

The invention herein described was made in the course of a contract with the Air Force Office of Scientific Research.

BACKGROUND OF THE INVENTION

Objects emit infrared radiation, which is invisible to the naked eye, having an intensity which is a function of the temperature and the emissivity of the object. Much effort has been directed to the problem of converting this heat image, which is invisible to the eye, into an image which can be seen.

Thermally responsive materials and devices would have many applications and could be used for example, as a direct visual indication that an object is so hot that contact with it is dangerous. Apart from the safety aspect, visual temperature indications by direct means would provide a decorative and useful agency.

Materials useful for such purposes have been taught be Fergason and Vogl in U.S. Pat. Nos. 3,114,836 and 3,409,404. These materials are cholesteric liquid crystals.

These liquid crystals or anisotropic liquids have been used as temperature, gas, electric field and shear sensing devices in many industrial and medical applications. However, their use is not as widespread as their properties would warrant because, on standing, these sensors lose their characteristic color response, as shown both by a fading of their intensities and by a shift of their maximum peak temperatures. We found that ultraviolet radiation and airborne particulate contaminants are mainly responsible for the degradation of the useful properties of detector elements made with cholesteric liquid crystal materials.

SUMMARY OF THE INVENTION

Our invention solves the prior art problems and prolongs the useful life of cholesteric liquid crystals by protectively packaging them in a substantially homogeneous mixture of stabilizers of the azoxy and azo-type and/or solid or liquid compatible protective polymeric materials.

BRIEF DESCRIPTION OF THE DRAWINGS

For a better understanding of the invention, reference may be made to the exemplary embodiments shown in the accompanying drawings in which:

FIG. 1, shows, in elevation, an anisotropic cholesteric liquid crystal on a substrate in homogeneous mixture with a radiation absorber and a protective polymeric material;

FIG. 2, shows, in schematic form, the thermooptical apparatus used to measure the useful life of the liquid crystal containing structures in the examples;

DESCRIPTION OF THE PREFERRED EMBODIMENTS

Figure 3:
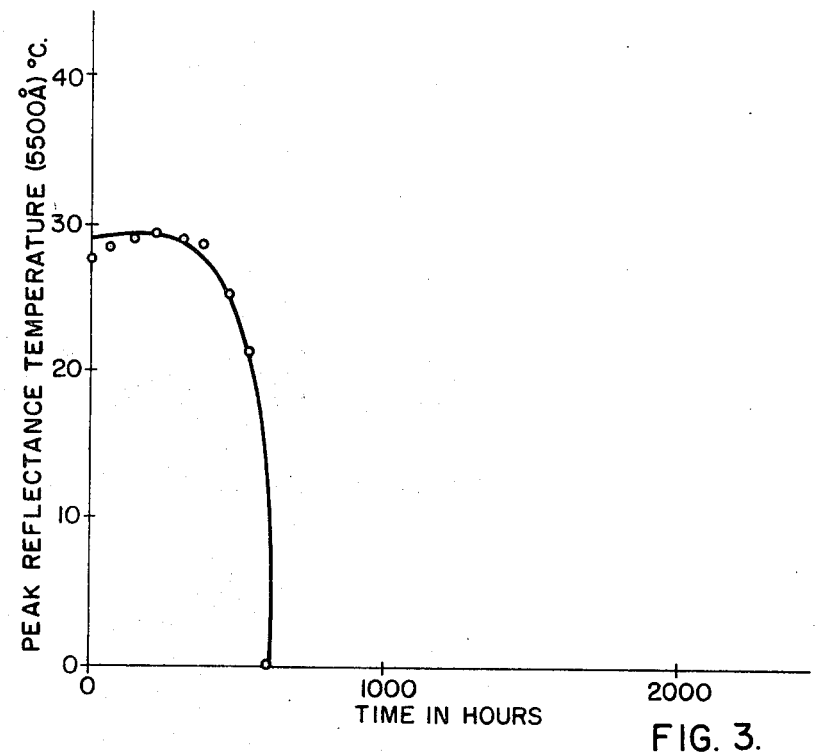
FIG. 3, is a graph showing the effect of ultraviolet radiation on the response of a standard (OCC–CN–CC) liquid crystal mixture not containing an ultraviolet stabilizer additive.

Liquid crystalline materials have properties that are intermediate between those of a true liquid and those of a true crystal, since they have an ordered structure while also exhibiting fluidity. Liquid crystalline materials are also referred to as materials in the mesomorphic state. Liquid crystalline materials are known and are characterized or identified by one of three phases or structures. One is the smectic structure which is characterized by its molecules being arranged in layers with the long axis approximately normal to the plane of the layers. The second is the nematic structure, which is characterized by thread-like molecules that tend to be and remain in nearly parallel orientation to each other but not arranged in discrete layers. The third is known as the cholesteric phase, the molecular configuration of which is a modification of the nematic structure. The present invention is concerned with materials which exhibit a cholesteric liquid crystalline phase and which are useful as detector elements giving visible response to a wide variety of external stimuli such as electric and magnetic fields, shear, pressure and heat.

The cholesteric phase has certain characteristics which are markedly different from either the smectic or the nematic phase. The characteristic properties of the cholesteric structure may be summarized as follows: (1) It is optically negative, while smectic and nematic structures are optically positive. (2) The structure is optically active. It shows strong optical rotary power. (3) When illuminated with white light, the most striking property of the cholesteric structure is that it scatters light selectively to give vivid colors. A cholesteric material exhibits a scattering peak having a bandwidth of about 200 Angstroms that occurs in or between the infrared and ultraviolet portions of the spectrum. (4) In the cholesteric structure, one circular polar component of the incident beam is completely unaffected. For the dextro cholesteric structure, it is only the circular polarized beam with counterclockwise rotating electric vector which is reflected. (The sign of rotation refers to an observer who looks in the direction of the incident light.) Levo cholesteric structures have the reverse effect. (5) When circular polarized light is scattered from these materials, the sense of polarization is unchanged. In ordinary materials, the sense of circular polarization is reversed. (6) The mean wave length of the reflection band depends upon the angle of incidence of the beam. The relationship can be roughly approximated by the Bragg diffraction equation for a birefringent material. These enumerated properties effectively define cholesteric liquid crystals. For further general information on this broad class of materials, reference should be made to the article by G. H. Brown and W. G. Shaw in *Chemical Reviews*, vol. 57, No. 6, Dec. 1957, p. 1,049, entitled "The Mesomorphic State – Liquid Crystals."

Some examples of suitable cholesteric liquid crystalline materials which can be used alone or in mixtures as electric and magnetic field, shear pressure and heat sensing compounds in this invention include mixed esters of cholesterol and inorganic acids such as cholesteryl chloride, cholesteryl bromide, cholesteryl nitrate, etc.; organic esters of cholesterol such as cholesteryl crotonate, cholesteryl nonanoate, cholesteryl formate, cholesteryl acetate, cholesteryl propionate, cholesteryl valerate, cholesteryl hexanoate, cholesteryl docosonoate, cholesteryl chloroformate, cholesteryl linolate, cholesteryl linolenate, cholesteryl oleate, cholesteryl erucate, cholesteryl butyrate, cholesteryl caprate, cholesteryl laurate, cholesteryl myristate, etc.; ethers of cholesterol such cholesteryl decyl ether, cholesteryl lauryl ether, cholesteryl dodecyl ether, etc.; carbonates and carbamates of cholesterol such as cholesteryl decyl carbonate, cholesteryl methyl carbonate, cholesteryl ethyl carbonate, cholesteryl butyl carbonate, cholesteryl docosonyl carbonate, cholesteryl cetyl carbonate, oleyl cholesteryl carbonate, cholesteryl heptyl carbamates, etc.; alkyl amides and aliphatic secondary amines derived from 3-beta-amino delta-5-cholestene, and the corresponding esters noted above of cholesterol, etc.

The alkyl portion of the above compounds comprises at least one compound selected from the group consisting of saturated and unsaturated fatty acids and alcohols having from one to 27 carbon atoms per molecule, the unsaturated members having from 1 to 6 olefinic groups per chain. Aryl substituents generally comprise a single benzene ring that may have one or more lower alkyl groups attached thereto.

The foregoing compounds exhibit a cholesteric liquid crystalline state over a given range of temperature. These temperature ranges in instances are small, and large in other instances for the list of materials given. The temperatures may be as low as about minus 20° C. to as high as about 250° C. The determination of the range for each material is easily made by heating the compound (or mixture) and noting the appearance of turbidity or possibly a color. After a further rise and at a definite temperature, the material clears to a true liquid and is no longer in the cholesteric liquid state. Upon cooling from the true liquid state, the action is reversed, though supercooling may depress the first noted temperature. The consistency of the various materials may range from a thick paste to a freely flowing liquid, while in the liquid crystalline state. The materials can be used in this state. Some are dissolved in a suitable solvent, for example, chloroform, ether, benzene, petroleum ether, petroleum naptha, carbon tetrachloride, common saturated hydrocarbon mixtures such as kerosene, and carbon disulfide, or other common organic solvents, and then poured onto a film or substrate from which the solvent evaporates. These films frequently can be separated from the support and located where desired.

Accordingly, each of the liquid crystal materials used in this invention has a characteristic temperature range at which it is to be used. For example, cholesteryl caprate exhibits the phase from 82° to 89° C; for cholesteryl chloride, the range is 95° to 97° C.; for cholesteryl cinnamate, the range is about 161° to 197° C.; for oleyl cholesteryl carbonate, the range is about 18° to 33° C.; for cholesteryl nonanoate, it is 79° to 90° C.; for cholesteryl arachidonate, the liquid crystalline phase occurs below 0° C.; for cholesteryl p-nitro benzoate, the liquid crystalline phase occurs in the range from about 189° to 250° C. at which latter temperature it decomposes. Many mixtures of compounds forming the cholesteric liquid crystalline state form cholesteric liquid crystal phases at room temperature and below. Considering the compounds and mixtures as a whole, detectors are thus now available to operate for ranges of 5° to 100° C. at any center temperature of +10° C. to in excess of 150° C. As is apparent, in using these materials in this invention, the materials will be used at the appropriate temperature to secure the cholesteric liquid crystalline phase.

Many of the foregoing compounds are available commercially, having substantial commercial uses. Others are disclosed in the literature to which reference can be made for details of preparations as well as general properties. Some methods of synthesis found to be especially useful are as follows: Cholesteric liquid crystals comprising carboxylic acid esters of cholesterol can be prepared by heating cholesterol and a carboxylic acid to the boiling point of the acid, or, in the case of high molecular weight acids, to about 200° C. After thorough reaction, the mixture is cooled to handling temperature. Cholesterol and carboxylic acids can also be made to react in a benzene solution or in other volatile hydrocarbon solvents upon the addition of a catalyst, for example, paratoluene sulfonic acid. Another useful method comprises reaction of an acyl halide with cholesterol in the presence of a suitable proton acceptor, for example pyridine or analogous compounds. This latter reaction can be performed in the presence of a solvent if desired though none is needed.

Using the latter process, cholesterol and pyridine can be dissolved in equal amounts in benzene. The acyl chloride being used is also dissolved in a similar amount of benzene and in a like molar quantity. Then this latter solution is added dropwise to the cholesterol-pyridine-benzene solution. The reaction proceeds spontaneously, usually with the evolution of heat and the formation of a fine white precipitate of pyridine hydrochloride. After complete addition of the acyl chloride, the mixture is refluxed for about 1 hour to insure complete reaction. Then the mixture is cooled to room temperature, the precipitate is filtered, washed with benzene and discarded. The filtrate and washings are then treated with a lower alkyl alcohol, for example methyl or ethyl alcohol. Crystallization is promoted by slow addition of the alcohol while constantly stirring. Recrystallization can be practiced to obtain the pure product. Cholesteryl alkyl or aryl carbonates can be readily made by first reacting phosgene with cholesterol, and reacting the product with the appropriate alcohol, in the presence of a proton acceptor, to produce the mixed ester carbonate. Suitably a solvent such as benzene is used as the reaction medium. Other suitable methods of synthesis can be used as desired.

We found that damage to the color characteristics of cholesteric liquid crystals exposed to artificial or natural light is in great part due to the effect of ultraviolet irradiation, which could reduce the useful life of liquid crystal films as a detector element to less than 2 weeks.

We found that aromatic azo compounds
and aromatic azoxy compounds

 (2)

having stable substitutions on one or both of the aryl (Ar or Ar') rings, when added to cholesteric liquid crystalline materials, materially decreased the deleterious effects caused by ultraviolet radiation. The azo and azoxy compounds useful in this invention are those that while prolonging the useful life of liquid crystals, do not substantially alter their color response.

By stable substitutions on the aryl rings of aromatic azo and aromatic azoxy compounds is meant: alkyl, halo, nitro, hydroxy, alkoxy, aroxy, ether and cyano substitutes.

Azo compounds can be named in two ways. The less complicated ones are named as derivatives of azobenzene. Positions of substituents in the rings are usually indicated by numbers, primes being used to distinguish between positions on the two rings. More complicated azo compounds can be named by considering the arylazo group Ar — N = N —, as a substituent. For further general information on this class of materials which are used mostly today as dyes, reference should be made to Morrison and Boyd, *Organic Chemistry*, Allyn and Bacon, Inc., 2nd Ed., 1966, Chapter 24.11.

A variety of substituted aromatic azo and azoxy compounds were added to cholesteric liquid crystals to give sensor compositions. Among those found particularly suitable in increasing heat sensing life of the compositions were:

A. 4-(phenyl azo) phenol

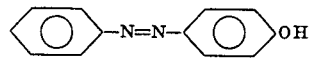

B. 4-(4'-ethoxy phenyl azo) phenyl 10-undecenoate

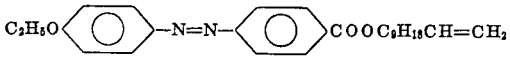

C. 4-(4'-ethoxy phenyl azo) phenyl hexanoate

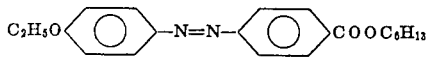

and

D. Azoxydianisole

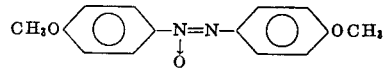

The upper weight percent limit of the substituted aromatic azo and azoxy ultraviolet absorber stabilizers is limited by solubility in the cholesteric liquid crystalline materials to which they are added. We found the useful concentration range of stabilizer in the sensing composition (liquid crystal plus stabilizer) to be between about 0.3 to 7 weight percent, with a preferred range between 1 to 6 weight percent, and an optimum range between 2 to 5 weight percent. Generally, at above about 6 weight percent stabilizer in the heat sensing compound (liquid crystal plus stabilizer), the stabilizer will crystallize out of the liquid crystal mixture. Generally, at below about 0.5 weight percent, the effect of the additive stabilizer in protecting the liquid crystal will not be very noticeable.

Degradation of the useful properties of cholesteric liquid crystals is due also to the influence of airborne particulate impurities. It was found that protecting a cholesteric liquid crystal material with certain clear colorless compatible polymeric materials increased the lifetime of the liquid crystal by preventing textural changes caused by atmospheric contaminants. Dust particles and such alighting on the surface of the liquid crystal without such protective packaging, would produce rippled areas of non-color response surrounding the particles.

Referring now to the drawings, FIG. 1 shows a sensing device, comprising a substrate support member 10 upon which a detector element 11 has been deposited. This detector element may contain liquid crystals, ultraviolet radiation stabilizers and polymeric protective material in a substantially homogeneous gel or solid phase mixture.

Generally, the criterion for the use of any material as a supporting substrate member, is that it not interfere, as by reacting with the liquid crystal that is to be deposited thereon, or affecting the optical properties of the cholesteric liquid crystal. Typical materials that have been used solely as a support include halogenated hydrocarbon resins (such as polytetrafluoroethylene), polyethylene terephthalate, glass, methylmethacrylate resins, polycarbonate resins and ceramics.

The liquid crystals in mixture with a protective polymeric material can be applied to the substrate member in a number of ways including painting, casting, or application with a dropper or spatula. A quite common method of application is to pour a solution containing the liquid crystal and protective polymeric material onto the support and allow the solvent to evaporate. This solution could also contain aromatic azo and azoxy stabilizer compounds in accordance with this invention.

One method of producing the detector element 11 in FIG. 1 is casting or otherwise depositing on substrate 10 a mixture containing (1) a sensor composition of cholesteric liquid crystalline materials and generally an ultraviolet radiation stabilizer, in a first solution and (2) chemically compatible protecting polymeric materials, in a second solution. This mixture is then allowed to evaporate. The protecting polymeric solution must be one in which the liquid crystals are soluble or miscible, such as, solutions of silicone resins and low molecular weight resinous copolymers of isobutylene and isoprene (butyl rubber). Other suitable protective polymeric materials would include polyvinyl chloride, polystyrene, polyacrylate, polycarbonate, polyesters, polyisoprenes and linear polyurethanes.

These are polymeric materials well known in the art and it is to be understood that they will be dissolved in suitable solvents in the practice of this invention. For example: cyclohexanone and tetrahydrofuran for polyvinyl chloride; benzene, toluene, ethyl benzene, carbon tetrachloride, chloroform, and o-dichlorobenzene for polystyrene; ethyl acetate, ethylene dichloride, trichloroethylene, chloroform, and toluene for polyacrylate; methylene chloride, chloroform, tetrahydrofuran and cis-1,2-dichloroethylene for polycarbonates; mixtures of phenol and tetrachloroethane for polyesters such as polyethylene terephthalate; benzene for polyisoprenes such as butyl rubber; and toluene for linear polyurethanes. Further reference may be made to 1968 Modern Plastics Encyclopedia pages 84–101 for the properties and effect of organic solvents on the above enumerated protective polymeric materials.

The protective packaging of the liquid crystals and ultraviolet absorber sensor compositions can also be accomplished by admixing the protective polymeric material in low molecular weight liquid form (average molecular weight of the polymer less than about 10,000). In this method the detector element will be cast or otherwise deposited on a substrate as a mixture containing: (1) a sensor composition of cholesteric liquid crystalline materials and generally an ultraviolet radiation stabilizer, in solution and (2) low molecular weight, liquid, chemically compatible, protecting polymeric material. Suitable low molecular weight, protecting polymeric materials would include silicone resins, polyisoprenes, polyvinyl chloride, polystyrene, polyacrylate, polycarbonate, polyesters and linear polyurethanes.

In all cases, the resulting cast detector element, whether in gel or solid form, will comprise a substantially homogeneous mixture of protective polymeric material (resin) and liquid crystalline material, with or without ultraviolet radiation absorbers. The protective polymeric material can comprise between about 1 to 20 weight percent of the resulting cast mixture after evaporation of solvents, with a preferred range of between about 3 to 10 weight percent. If below 1 weight percent of the evaporated substantially homogeneous mixture is the protective polymeric material, the protective effect is too small and if above 20 weight percent of the evaporated substantially homogeneous mixture is the protective polymeric material, the response colors are diluted.

FIG. 2 shows the apparatus used in determining aging effects of the liquid crystals, by recording the behavior of the peak reflectance temperature using a 5,500 A. wavelength optical filter, as a function of time. The liquid crystal sample was tested on this apparatus, after being irradiated with ultraviolet light having a wavelength of 3,660 A., at regular time intervals to determine whether their maximum reflectance temperatures (temperature at which the liquid crystals give their most intense color) and color intensities had changed for a certain color (5,500 A. filter).

The He-light source illuminates the liquid crystal. The X-Y recorder identifies the peak wavelengths of the reflected light and their relation to temperature. Light reflected by the liquid crystal travels upward through a lens into a photomultiplier tube shielded from the lamp. The suitable amplified output of the photomultiplier tube is fed into the Y-axis of the recorder. The amplitude of the Y ordinates depends on the photomultiplier current which in turn depends on the intensity of the reflected light reaching the photomultiplier cathodes through the lens. The temperature of the liquid crystal film can be varied by means of a thermoelectric (T.E.) element which provides heating or cooling as required.

As shown in FIG. 2, an aluminum block placed between the T.E. element and the film provides some heat storage and the location for temperature control and measurements. Three holes drilled in this block accept two thermistors (TH–1 and TH–2) and a thermocouple (T.C.). Thermistor TH–1 forms part of an electrical circuit which feeds the X-axis of the recorder. The thermocouple (T.C.) connected to a hand-operated high precision potentiometer, affords high accuracy and the thermocouple reading gives a separate and individual calibration for every test run made.

A copper heat sink and cooling arrangement are provided for the T.E. elements, and the optical setup is enclosed in a dark box to exclude room light.

EXAMPLE 1

The cholesteric liquid crystal ingredients obtained from commercial sources were found to contain, in some cases, as much as 20 weight percent impurities, whose temperature and field effect responses were different from those of the desired heat sensing material. It was found that the three cholesteric compounds used for this work (cholesteryl nonanoate, cholesteryl chloride and oleyl cholesteryl carbonate) could be satisfactorily purified (i.e., impurities could not be detected by differential thermal analysis) by means of at least two recrystallizations.

The standard cholesteric liquid crystal mixture used was: 33 parts by weight of purified oleyl cholesteryl carbonate (OCC-recrystallized twice from hot acetone), 40 parts by weight of cholesteryl nonanoate (CN-recrystallized twice from hot methyl alcohol), and 27 parts by weight of cholesteryl chloride (CC-recrystallized twice from hot methyl alcohol).

These ingredients were thoroughly mixed and then dissolved in analytically pure chloroform to give a 10 percent by weight solution.

This solution was poured onto 20 mil (0.020 inch) thick polyethylene terephthalate (MYLAR) sheets stretched over a brass hoop. The chloroform solvent was allowed to evaporate and the resulting liquid crystal film was evacuated at 10 mm Hg pressure to remove all traces of solvent. The resulting cholesteric liquid crystal films (33 wt. % OCC, 40 wt. % CN, 27 wt. % CC) were about 20 microns thick.

The liquid crystal films mounted on the MYLAR sheets were placed in a Plexiglass (polymethyl methacrylate) support frame, the top of which acted as a filter opaque to wavelengths shorter than 3,600 A., and irradiated by a Gelman-Camay Model 51402 ultraviolet light source (3,660 A. Hg lamp) at a distance of 10 cm, in an atmosphere of 21 v/v percent oxygen in argon. The peak reflectance temperatures were measured at regular time intervals on the apparatus shown in FIG. 2 of the drawings and described in the specification, to determine if the maximum reflectance temperature and intensity had changed for a certain color (5,500 A. filter) due to accelerated irradiation of the liquid crystal films. One hour short distance exposure to the Hg lamp was equivalent to about from 3 to 5 hours exposure to outdoor or normal fluorescent lighting.

The color response life of the unpackaged unstabilized liquid crystal sample dropped abruptly, and the peak reflectance temperature changed dramatically after 500 hours of exposure to the Hg lamp. After 250 hours, the maximum reflectance temperature changed more than ± 3° C. FIG. 3 shows the behavior of the peak reflectance temperatures (only 5,500 A. shown) as a function of time for the irradiated sample.

EXAMPLE 2

To the standard liquid crystal mixture of Example 1 (33 parts oleyl cholesteryl carbonate, 40 parts cholesteryl nonanoate, 27 parts cholesteryl chloride) was added from 1 to 6 weight percent of the following ultraviolet absorbing stabilizers:

A. 4-(phenyl azo) phenol: 1, 2, 4 and 5 weight percent;
B. 4-(4'-ethoxy phenyl azo) phenyl 10-undecenoate: 4, 5, and 6 weight percent;
C. 4-(4'-ethoxy phenyl azo) phenyl hexanoate: 4, 5 and 6 weight percent;
D. Azoxydianisole: 1, 2, 4 and 5 weight percent;
E. Cholesteryl 4-(phenyl azo) benzoate: 4, 5 and 6 weight percent;
F. Cholesteryl 4-(phenyl azo) phenyl carbonate: 4, 5 and 6 weight percent; and
G. Benzophenone: 1, 3 and 5 weight percent.

After addition and thorough mixing of the stabilizers, the stabilizer-liquid crystal materials were dissolved in analytically pure chloroform solvent to give 10 percent by weight solutions. These solutions were poured on 20 mil thick MYLAR sheets stretched over a brass hoop. The solvent was allowed to evaporate and the resulting film was evacuated at 10 mm Hg pressure to remove all traces of solvent. The resulting liquid crystal films were about 20 microns thick.

The stabilized cholesteric liquid crystal films mounted on the MYLAR sheets were placed in a Plexiglass support frame, the top of which acted as a filter opaque to wavelengths shorter than 3,600 A., and irradiated by a Gelman-Camay Model 51402 Ultraviolet light source (3,660 A. Hg lamp) at a distance of 10 cm, in an atmosphere of 21 v/v percent oxygen in argon. As in Example 1, the peak reflectance temperatures were measured at regular time intervals on the apparatus shown in FIG. 2 of the drawings and described in the specification.

The following Table 1 gives the period of time over which the maximum reflectance temperature changed no more than ± 2° to 3° C.

TABLE 1

Color response life: hours of exposure, 3660 A. Ultraviolet radiation at 10 cm., for stabilizer, percent of sample

[Sample: (OCC, CN, CC)+stabilizer.]

| | Hours | | | | | | |
|---|---|---|---|---|---|---|---|
| | 0% | 1% | 2% | 3% | 4% | 5% | 6% |
| Standard plus A | | 4,200+ | 4,200+ | | 4,200+ | 4,200+ | |
| Standard plus B | | | | | 4,200+ | 4,200+ | 4,200+ |
| Standard plus C | | | | | 4,200+ | 4,200+ | 4,200+ |
| Standard plus D | | 500 | 1,000 | | 1,000 | 1,000 | |
| Standard plus E | | | | | 1,000 | 1,000 | 2,000 |
| Standard plus F | | | | | ¹ 50 | ¹ 100 | ² 100 |
| Standard plus G | | ³ 10 | | ³ 10 | | ³ 10 | |
| Standard | 250 | | | | | | |

¹ No color after 500 hours.
² No color after 1,000 hrs.
³ No color after 100 hrs.

Figure 4:
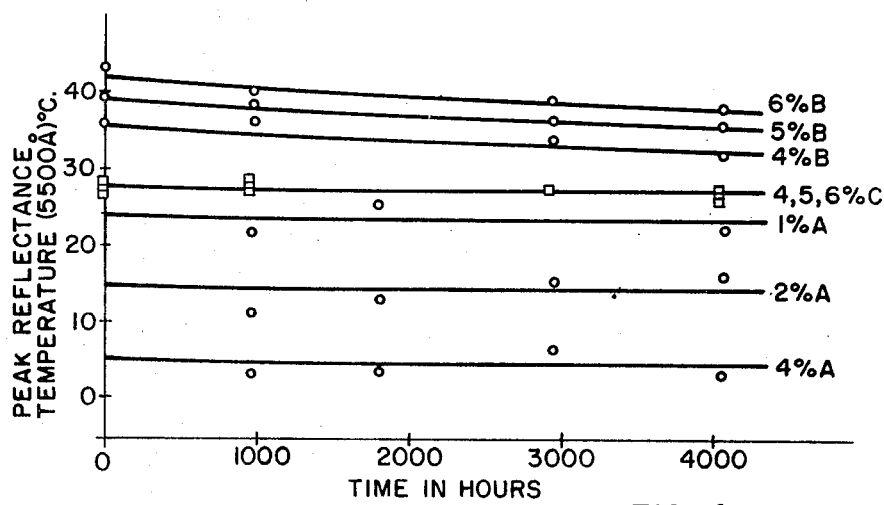
FIG. 4, is a graph showing the effect of ultraviolet radiation on the response of a standard (OCC–CN–CC) liquid crystal mixture with stabilizer A[(1,2,4 percent by weight of 4-(phenyl azo) phenol], B [(4,5,6 percent by weight of 4-(4'-ethoxy phenyl azo) phenyl 10-undecenoate)] and C[(4,5,6 percent by weight of 4-(4'-ethoxy phenyl azo) phenyl hexanoate)]
Figure 5:
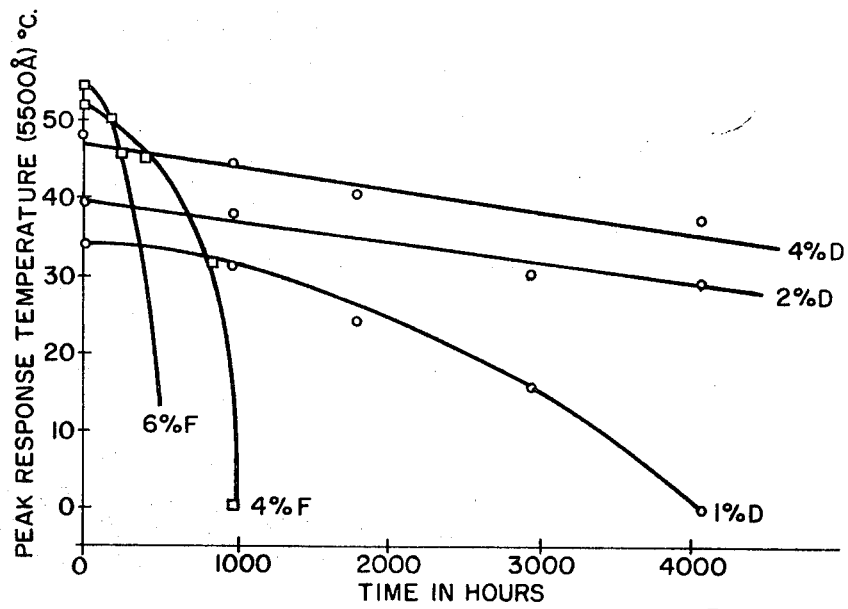
FIG. 5, is a graph showing the effect of ultraviolet radiation on the response of a standard (OCC–CN–CC) liquid crystal mixture with stabilizer D[1,2,4 percent by weight of azoxydianisole)] and additive F[(4,6 percent by weight of cholesteryl 4-(phenyl azo ) phenyl carbonate )]
Figure 6:
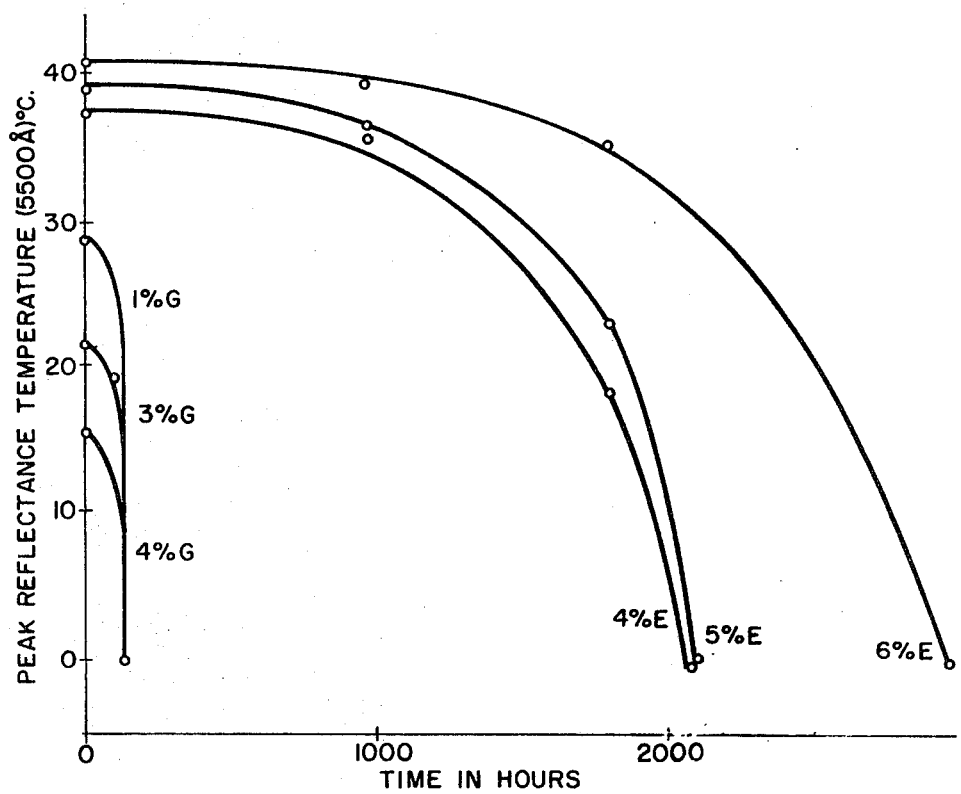
FIG. 6, is a graph showing the effect of ultraviolet radiation on the response of a standard (OCC–CN–CC) liquid crystal mixture with stabilizer E [(4,5,6 percent by weight of cholesteryl 4-(phenyl azo) benzoate)] and additive G [(1,3,4 percent by weight of benzophenone)].

FIGS. 4, 5 and 6 show the behavior of the peak reflective temperatures (only 5,500 A. shown) as a function of time for the irradiated stabilized samples.

FIG. 3 shows the extreme sensitivity of liquid crystals not containing stabilizers to ultraviolet radiation; in fact, the useful life of the unprotected system is of the order of 250 hours.

Stabilizers A [(4-(phenyl azo) phenol)], B [(4-(4'-ethoxy phenyl azo) phenyl 10-undecenoate)], and C [(4-(4'-ethoxy phenyl azo) phenyl hexanoate)], as shown in Table 1 and FIG. 4, produce an enormous (almost infinite increase in the useful life of the liquid crystal system under the same accelerated aging conditions as the standard without stabilizers, and are relatively concentration independent. These additives are extremely effective in shielding the liquid crystal mixture from the effect of ultraviolet irradiation.

Stabilizers D [(azoxy dianisole)] and E [(cholesteryl 4-(phenyl azo) benzoate)], as shown in Table 1 and FIGS. 5 and 6, increase the useful life of the liquid crystal system to about 1,000 hours (a minimum of about a 400 percent increase) under the same accelerated aging conditions as the standard without stabilizers. The effects here are concentration dependent. These additives are very effective in shielding the liquid crystal mixture from the effect of ultraviolet irradiation.

Additive F [(cholesteryl 4-(phenyl azo) phenyl carbonate)], a cholesteryl carbonate ester, has a useful lifetime of about the same order as the standard unstabilized sample of Example 1, as shown in FIG. 5. The cholesteryl carbonate ester moiety in additive F

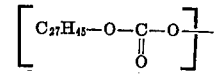

is a known unstable group attached to the aryl ring (as also shown by the room temperature instability of OCC), being rapidly degraded in the presence of $O_2$. Benzophenone, additive G,

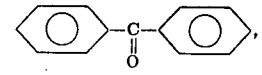

is a known ultraviolet radiation absorber. It is not an azo or azoxy compound and gives very poor results, in fact, accelerating the degradation to a rate which is faster than that exhibited by the standard unstabilized sample of Example 1 as shown in FIG. 6. Benzophenone is an active producer of free radicals and causes rapid decomposition of the liquid crystal film presumably due to attack on oleyl cholesteryl carbonate (OCC).

Tests were also run to determine the long term effect of the stabilizers on the regular color response of the stabilized liquid crystal mixtures in the absence of ultraviolet radiation. The stabilized liquid crystal mixtures of Table 1 were aged in a refrigerator at 5° C. in the absence of ultraviolet radiation for 1,224 hours and the peak reflectance temperatures measured (5,500 A. optical filter). We found that stabilizers A, B, C, D and E could be safely used after about 2 months storage without appreciably affecting the color response of the liquid crystal system.

EXAMPLE 3

The same standard liquid crystal mixture of Example 1 (33 parts oleyl cholesteryl carbonate, 40 parts cholesteryl nonanate, 27 parts cholesteryl chloride) was dissolved in analytically pure chloroform solvent to give 10 percent by weight solutions. This solution was poured onto polyethylene terephthalate (MYLAR) sheets about 1 mil thick. The solvent was allowed to evaporate and the resulting liquid crystal film was evacuated to remove all traces of solvent. The resulting cholesteric liquid crystal films (33 wt. % OCC, 40 wt. % CN, 27 wt. % CC) were about 20 microns thick.

A second sheet of MYLAR was then placed over one of the liquid crystal films and first MYLAR sheet to encapsulate and provide protective packaging for the liquid crystal. This second sheet was about 2 mils thick.

Liquid crystals in a first solution were also protectively packaged by casting them together with either a second solution of 5 percent weight to volume poly γ-benzyl L-glutamate (sold by Pilot Chemical Co.) onto a MYLAR film support or a second solution of 20 percent weight to volume poly t-butylisocyanate, and allowing the solutions to evaporate. The colorless polymeric protective packaging materials in the evaporated mix acted as the protective agent for the liquid crystals. The evaporated mix was a homogeneous mixture of polymeric protective material and liquid crystals.

Similarly, portions of the standard cholesteric liquid crystal mixture, in 10 percent chloroform solution, were also homogeneously mixed with various other plastic polymeric fluids and the mixture cast into films which after evaporation comprised a homogeneous liquid crystal-protective packaging combination. To 9 parts of the standard liquid crystal mixture in 10 percent chloroform solution, 1 part of clear liquid silicone resin as a 10 percent solution in xylene solvent (sold under the trade name R-611 Silicone by Union Carbide Corp. having a viscosity at 25° C. of about 135 cp. and a specific gravity of about 1.054), was added. Similarly, to 9 parts of the standard liquid crystal mixture in 10 percent chloroform solution, 1 part of clear liquid butyl rubber as a 10 percent solution in benzene (low molecular weight copolymer of isobutylene and isoprene sold under the trade name of LM Butyl 504 by Enjay Chemical Co.), was added. Both of the clear protecting fluids were soluble in the liquid crystal solution. Both mixtures were thoroughly blended, cast as a film on a MYLAR substrate and allowed to evaporate. The self packaged, homogeneously encapsulated, cholesteric liquid crystal heat sensing article, containing about 10 weight percent protective polymeric packaging materials was about 5 mils thick.

As a control sample, one supported cast liquid crystal film 20 microns thick was left unprotected.

All of the packaged liquid crystal films and the unpackaged liquid crystal film were irradiated as in Examples 1 and 2, and the change in color response noted using the apparatus shown in FIG. 2, and described in the specification. Table 2 gives the test results for the protectively packaged heat sensing articles:

TABLE 2

Effect of Protective Packaging Combination On The Initial Color Response of Standard Liquid Crystal System

| Sample | Peak Reflectance Temperature, °C (5,500 A filter) |
|---|---|
| liquid crystal unprotected | 36.4 |
| liquid crystal protected by polyethylene terephthalate sheet | 36.4 |
| liquid crystal in a homogeneous mixture with poly γ-benzyl L-glutamate resin | 36.4 |
| liquid crystal in a homogeneous mixture with poly-t-butylisocyanate resin | 19.9 |
| liquid crystal in a homogeneous mixture with silicone resin | 34.1 |
| liquid crystal in a homogeneous mixture with butyl rubber | 36.2 |

These results show that all of the systems tested except the liquid crystal system protected by poly t-butylisocyanate have promise, especially since the intensity of the color response was not appreciably affected by the protective packaging treatment. Liquid crystal systems also containing 0.4 percent by weight 4-(4'-ethoxy phenyl azo) phenyl hexanoate stabilizer gave similar satisfactory results.

The samples of Table 2 were then left open to the atmosphere for several weeks. The unprotected liquid crystal film developed craters one-half hour after preparation and was completely degraded after 2 weeks. Initial observations of degrading liquid crystal films led one to believe that crater formation was associated with the presence of airborne, solid contaminants. Microscopic examination showed that these were in fact dust particles or fibers in a great number of the craters which had formed. The larger craters (about one-eighth inch in diameter) usually had a region that no longer contained liquid crystalline material.

In the majority of cases where craters had formed there was a ring of small, focal-conic spherulites having definite boundaries inside and out. The outside of this ring made contact with the main body of the liquid crystal which exhibited the cholesteric plane texture. Many small craters (less than 300 microns diameter) did not have a definite inner boundary and, occasionally, the focal-conic spherulites extended to the center of the disturbance. The immediate effect of a foreign body, such as an airborne fiber, was to cause a drastic change in the orientation of the liquid crystal surrounding the impact area. This then developed into a crater as described.

The lifetime of the liquid crystal protected by polyethylene terephthalate sheets was lengthened by preventing crystalline breakdown arising from atmospheric contaminants. However, crystalline incongruities in the polyethylene terephthalate surface could also cause changes in the color response of the liquid crystal film.

The other systems: liquid crystal protected by poly γ-benzyl L-glutamate, poly-t-butylisocyanate, silicone resin and butyl rubber, protected the liquid crystal films without any deleterious effects and no large number of craters could be observed after a 2 week period.

We claim:

1. A composition of matter comprising a cholesteric liquid crystalline material and from about 0.3 to 7 weight percent of an ultraviolet radiation stabilizer selected from the group consisting of substituted aromatic azo compounds and substituted aromatic azoxy compounds wherein the substituents on the aryl rings of the azo and azoxy compounds are selected from the group consisting of alkyl, halo, nitro, hydroxy, alkoxy, aroxy, ether and cyano substitutions.

2. The composition of matter of claim 1 wherein the stabilizers are selected from the group consisting of 4-(phenyl azo) phenol, 4-(4'-ethoxy phenyl azo) 10-undecenoate, 4-(4'-ethoxy phenyl azo) phenyl hexanoate, azoxydianisole, and cholesteryl 4-(phenyl azo) benzoate and the stabilizers comprise from 1 to 6 weight percent of the composition.

3. The composition of matter of claim 2 wherein the liquid crystalline material is selected from the group consisting of oleyl cholesteryl carbonate, cholesteryl nonanoate, cholesteryl chloride and mixtures thereof.

4. The composition of matter of claim 2 in homogeneous mixture with a protective polymeric material selected from the group consisting of silicone resin, polyisoprene poly γ-benzyl L-glutamate, polyvinyl chloride, polystyrene, polycarbonate, linear polyurethane, polyacrylate and polyester.

5. The composition of matter of claim 4 wherein the protective polymeric material comprises between about 1 to 20 weight percent of the homogeneous mixture.

6. A detector element comprising a homogeneous mixture of a clear protective polymeric plastic material and a sensor composition comprising cholesteric liquid crystalline material and an ultraviolet radiation stabilizer selected from the group consisting of aromatic azo compounds and aromatic azoxy compounds.

7. The detector element of claim 6 wherein the protective polymeric material is selected from the group consisting of silicone resin, polyisoprene, poly γ-benzyl L-glutamate, polyvinyl chloride, polystyrene, polycarbonate, linear polyurethane, polyacrylate and polyester.

8. The detector element of claim 7 wherein the sensor composition contains cholesteric liquid crystalline material and from 1 to 6 weight percent of an ultraviolet radiation stabilizer selected from the group consisting of 4-(phenyl azo) phenol, 4-(4'-ethoxy phenyl azo) phenyl 10-undecenoate, 4-(4'-ethoxy phenyl azo) phenyl hexanoate, azoxydianisole, and cholesteryl 4-(phenyl azo) benzoate.

9. The detector element of claim 7 wherein the sensor composition contains cholesteric liquid crystalline material and from about 0.3 to 7 weight percent of an ultraviolet radiation stabilizer selected from the group consisting of substituted aromatic azo compounds and substituted aromatic azoxy compounds wherein the substituents on the aryl rings of the azo and azoxy compounds are selected from the group consisting of alkyl, halo, nitro, hydroxy, alkoxy, aroxy, ether and cyano substitutions.

10. The detector element of claim 8 wherein the liquid crystalline material is selected from the group consisting of oleyl cholesteryl carbonate, cholesteryl nonanoate, cholesteryl chloride and mixtures thereof.

11. A method of making a detector element article comprising the steps:
1. adding from about 0.3 to 7 weight percent of an ultraviolet radiation stabilizer selected from the group consisting of aromatic azo compounds and aromatic azoxy compounds to a cholesteric liquid crystalline material to form a stabilizer liquid crystal material,
2. mixing and dissolving the stabilizer-liquid crystal material in a solvent to form a first solution, and thereafter
3. homogeneously mixing the stabilizer-liquid crystalline solution with a liquid comprising a clear protective polymeric material selected from the group consisting of silicone resin, polyisoprene, poly γ-benzyl L-glutamate, polyvinyl chloride, polystyrene, polycarbonate, linear polyurethane, and polyester, said mixture being deposited on a substrate and the solvent evaporated to form a homogeneously protectively packaged stabilizer-liquid crystalline detecting article.

12. The method of claim 11 wherein the stabilizer is selected from the group consisting of 4-(phenyl azo) phenol, 4-(4'-ethoxy phenyl azo) phenyl 10-undecenoate, 4-(4'-ethoxy phenyl azo) phenyl hexanoate, azoxydianisole, and cholesteryl 4-(phenyl azo) benzoate.

* * * * *